United States Patent [19]
Freeborn

[11] Patent Number: 5,114,318
[45] Date of Patent: May 19, 1992

[54] AUTOMATIC-CYCLING HEAT-POWERED FLUID PUMP

[76] Inventor: John C. Freeborn, P.O. Box 538/51818 Cheyenne Tr., Morongo Valley, Calif. 92256

[21] Appl. No.: 726,260

[22] Filed: Jul. 5, 1991

[51] Int. Cl.⁵ .......................... F04B 17/00; F03G 7/06
[52] U.S. Cl. ..................................... 417/379; 60/641.9
[58] Field of Search ...................... 417/379; 60/641.9

[56] References Cited

U.S. PATENT DOCUMENTS

| | | | |
|---|---|---|---|
| 2,039,999 | 5/1936 | Holyfield | 417/379 |
| 2,389,067 | 11/1945 | Lieberman | 417/379 |
| 2,688,923 | 9/1954 | Bonaventura | 417/379 |
| 3,937,599 | 2/1976 | Thureau | 417/379 |
| 4,036,019 | 7/1977 | Siegel | 60/531 |
| 4,177,019 | 12/1979 | Chadwick | 417/379 |
| 4,197,060 | 4/1980 | Chadwick | 417/379 |
| 4,207,034 | 6/1980 | Zeimer | 417/379 |
| 4,231,720 | 11/1980 | Konig | 417/379 |
| 4,390,325 | 6/1983 | Elo | 417/395 |
| 4,427,350 | 1/1984 | O'Hare | 417/379 |
| 4,508,493 | 4/1985 | O'Hare | 417/379 |
| 4,543,788 | 10/1985 | Monreal Urzay | 60/531 |
| 4,655,691 | 4/1987 | Wakao | 417/379 |

Primary Examiner—Richard A. Bertsch
Assistant Examiner—Peter Korytnyk

[57] ABSTRACT

An improved heat-powered pump comprising two variable-volume fluid-containing systems located within two rigid walled containers, a pumping container and a condensing container. Each variable volume system is composed of a first variable volume chamber located within the pumping container, a second variable volume chamber located within the condensing container and a fluid conducting means interconnecting the first and second variable volume chambers. The fluid to be pumped occupies one of the two above-described systems and a quantity of a volatile working fluid which changes between its liquid and vaporous states during a normal pumping cycle occupies the other of the two systems. Finally a heat source is provided for vaporizing the volatile liquid and a heat sink is provided for condensing the volatile liquid vapor.

12 Claims, 4 Drawing Sheets

AUTOMATIC-CYCLING HEAT-POWERED FLUID PUMP

BACKGROUND

This invention relates to fluid pumps and is particularly directed to heat-powered fluid pumps having no mechanical parts.

PRIOR ART

The need for pumping water and other fluids, for such uses as irrigation and domestic purposes, has been known for thousands of years and numerous types of pumping devices have been proposed for accomplishing such pumping. Various types of mechanical pumps have been known for most of this period, but have needed considerable maintenance and have some external power source for actuating the pump. Manual, beast, wind, electrical and internal combustion engines have all been suggested for driving mechanical pumps. However, in many parts of the world, electricity and fuel for internal combustion engines are non-existent or are extremely expensive and difficult to obtain. On the other hand, wind power is often unreliable and human or animal power is highly inefficient. In recent years, heat-powered pumps have been proposed and various devices, such as solar heaters, have been proposed for providing the required heat. Unfortunately, most of the prior art heat-powered pumps have been complicated and expensive to produce and operate. Many of the prior art heat-powered pumps have still required mechanical moving parts and, hence, have required considerable maintenance by skilled mechanics, which are often unavailable in remote areas where such pumps have the greatest potential usage. A search in the United States Patent Office has revealed the following:

| U.S. PAT. NO. | INVENTOR | ISSUED |
|---|---|---|
| 4,177,019 | D. G. Chadwick | Dec. 4, 1979 |
| 4,821,517 | C. Zarotti | Apr. 18, 1989 |
| 4,231,720 | A. Konig | Nov. 4, 1980 |
| 4,197,060 | D. G. Chadwick | Apr. 8, 1980 |
| 4,036,019 | I. Siegel | Jul. 19, 1977 |
| 4,507,922 | S. Kolt | Apr. 2, 1985 |
| 4,207,034 | R. Zeimer | Jun. 10, 1980 |
| 4,390,325 | A. Elo et al | Jun. 28, 1983 |
| 4,543,788 | D. M. Urzay | Oct. 1, 1985 |
| 4,390,323 | F. L. Burnham | Jun. 28, 1983 |

Each of these references is subject to the limitations discussed above. Thus, none of the prior art pumps have been entirely satisfactory.

BRIEF SUMMARY AND OBJECTS OF INVENTION

The present invention not only overcomes these disadvantages of prior art fluid pumps, but also provides some significant new characteristics and advantages, while maintaining its extreme structural simplicity. As in many prior art heat-powered pumps, the present invention makes use of the volumetric expansion and contraction inherent in the vaporization and condensation of a volatile liquid to achieve the output and intake fluid flow. A particularly advantageous characteristic of the present invention is that it achieves an automatic transfer of volatile liquid vapor from a heat-source area to a heat-sink area when vaporization is complete and an automatic return transfer of volatile liquid from a heat-sink area to a heat-source area when condensation is complete.

A further feature of the transfer means is that it automatically locks successive stages into a 180 degree phase relationship when successive stages are connected in cascade, so that the output of one stage supplies the input of the next higher pressure stage. In this form, the present invention becomes an attractive possibility as a vapor compressor in a conventional refrigeration or air conditioning system.

Another advantageous characteristic of the present invention is that its operation is not affected by system pressure. It is a cycling system that delivers the same volume each cycle against any load pressure compatible with the vapor pressure vs temperature conditions of the system. The fact that the system can be pressurized or evacuated to any desired pressure permits the selection of a volatile liquid which is most suited to the pumping task to be accomplished.

The advantages of the present invention are preferably attained by providing an improved heat-powered pump comprising two variable-volume fluid-containing systems located within two rigid walled containers, a pumping container and a condensing container. Each variable volume system is composed of a first variable volume chamber located within the pumping container, a second variable volume chamber located within the condensing container and a fluid conducting means interconnecting the first and second variable volume chambers. The fluid to be pumped occupies one of the two above-described systems and a quantity of a liquid more volatile than the fluid to be pumped occupies the other of the two systems. Finally a heat source is provided for vaporizing the volatile liquid and a heat sink is provided for condensing the volatile liquid vapor.

Accordingly, it is an object of the present invention to provide an improved fluid pump.

Another object of the present invention is to provide an improved fluid pump which is powered by heat.

An additional object of the present invention is to provide an improved fluid pump having few, if any, moving parts.

Another object of the present invention is to provide an improved fluid pump that cycles automatically.

An additional object of the present invention is to provide an improved fluid pump whose cyclic action is compatible with any system pressure.

A further object of the present invention is to provide an improved fluid pump which requires little, if any, maintenance.

A specific object of the present invention is to provide an improved heat-powered pump comprising two variable-volume fluid-containing systems located within two rigid walled containers, a pumping container and a condensing container. Each variable volume system is composed of a first variable volume chamber located within the pumping container, a second variable volume chamber located within the condensing container, and a fluid conducting means interconnecting the first and second variable volume chambers. The fluid to be pumped occupies one of the two above described systems and a quantity of a volatile working liquid occupies the other of the two systems. Finally a heat source is provided for vaporizing the volatile liquid and a heat sink is proviced for condensing the volatile liquid vapor.

These and other objects and features of the present invention will be apparent from the following detailed description, taken with reference to the figures of the accompaning drawings.

DETAILED DESCRIPTION OF THE INVENTION

Figure 1:
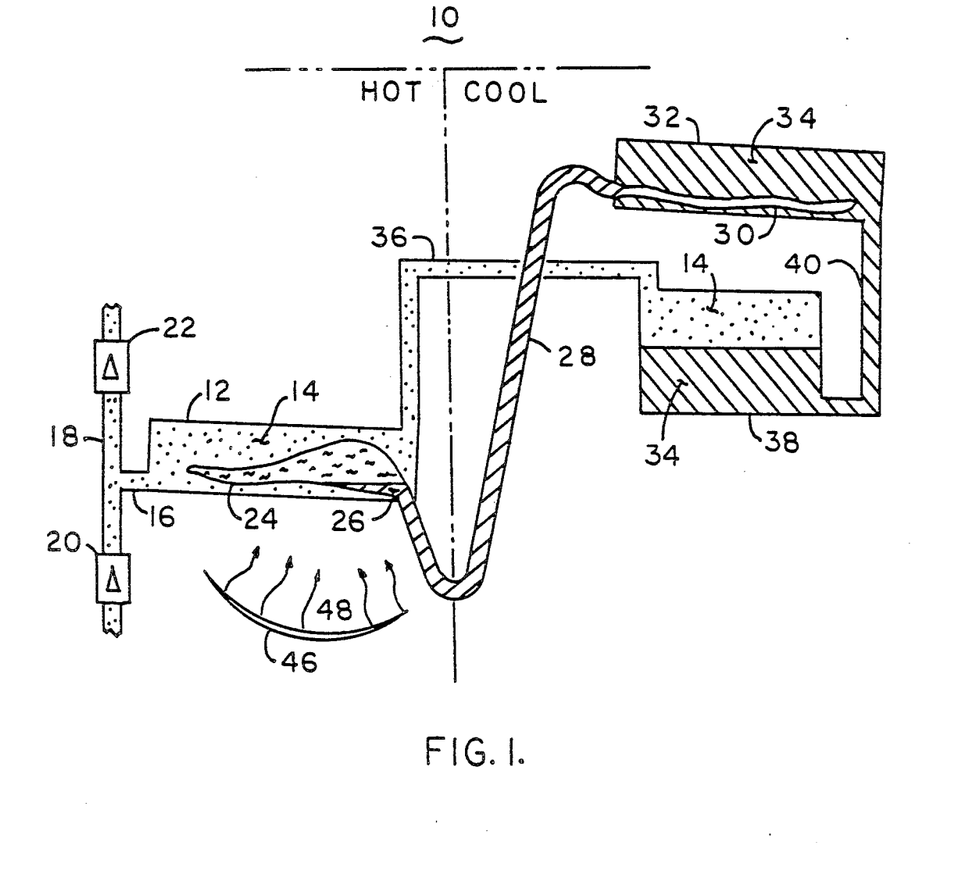
FIG. 1 is a diagrammatic representation of a form of the pump embodying the present invention which is preferred for pumping gaseous fluid.

In that form of the present invention chosen for purposes of illustration, FIG. 1 shows a fluid pump as constructed and operative which was designed to compress and pump gaseous fluid of negligeable specific gravity. The fluid 14 is drawn into and discharged out of the pumping chamber 12 through conduit 16 from a supply chamber 18 having check valves 20 and 22 to control flow of fluid into and out of the supply chamber 18 respectively. A first variable volume chamber, in this embodiment a flexible bag called the pumping bag 24 is located within the pumping chamber 12, formed of fluid-impermiable flexible material, and contains a quantity of a volatile liquid 26 such as Dupont HCFC 14 1b which is an environmentally acceptable alternative to freon and has a boiling point of 89 degrees F. at 15 psia (pounds per square inch absolute). A generally U-shaped tube 28 is connected to the lowest point of the pumping bag 24 and extends downward through the bottom of the pumping chamber 12 and, thence, upward to a second variable volume chamber, in this embodiment a flexible bag called the condensing bag 30, formed of similar material to that of the pumping bag 24, located within a condensing chamber 32. This condensing chamber is formed of rigid material, is located in a cooler environment, and is positioned above the level of the pumping chamber 12. As shown, a pipe 36 connects the top of pumping chamber 12, with the top of an equalizing chamber 38, while a second pipe 40, connects the bottom of the equalizing chamber 38, with the bottom of the condensing chamber 32. As shown, a quantity of water or other non-volatile liquid 34, is contained within the equalizing chamber 38, the pipe 40, and the condensing chamber 32, while the fluid to be pumped 14, fills the pumping chamber 12, pipe 36, and the equalizing chamber 38 above the levels of the liquid 34. Initially, the volatile fluid 26, will be in its liquid state and will all flow down the U-shaped tube 28 into the pumping bag 24 leaving the condensing bag 30 empty and collapsed. This condition is a result of gravity flow when the relative elevations of the pumping chamber 12, the condensing chamber 32, and the equalizing chamber 38 are such that the weight of the volatile liquid in the tube 28 is sufficient to overbalance the weight of the non-volatile liquid 34 in the pipe 40. Heating means, such as the solar reflector 46, is provided to reflect solar energy, indicated by rays 48 toward the pumping chamber 12 to apply heat to the pumping bag 24. Finally, heat removal means, not shown in FIG. 1 is provided to keep condensing chamber 32, at a sufficiently low temperature to condense the volatile fluid vapor.

In use consider the pump 10 in its initial condition, when cold, as it would be at the start of the day in a solar activated system. At this time there would be no vapor in the volatile fluid system, which comprises the pumping bag 24, the condensor bag 30, and the interconnecting U-shaped tube 28. The condensor bag 30 would be completely collapsed and all of the volatile fluid 26 would be in liquid form and would descend to reside in the pumping bag 24 and the U-shaped tube 28. This condition can be achieved by adjusting the relative heights of the pumping chamber 12, condensing chamber 32 and equalizing chamber 38 to make the weight of the column of volatile fluid 26 in the U-shape tube 28 exceed the weight of liquid 34 which is in the tube 40 connecting the condensing chamber 32 with the equalizing chamber 38. Under these conditions a siphon action is initiated which causes flow downward in pipe 28 and upward in pipe 40. A stable condition exists when the condensor bag 30 is empty.

As the heating means 46 supplies heat to the pumping chamber 12 and pumping bag 24, this serves to evaporate the volatile fluid 26 contained in the pumping bag 24. Evaporation of the volatile fluid 26 creates vapor pressure within the flexible pumping bag 24 and causes the pumping bag 24 to expand, which serves to displace some of the fluid 14 to be pumped from the pumping chamber 12 and forces the fluid 14 to be pumped to flow out of conduit 16 and fluid supply chamber 18 through the output check valve 22. This action in the pumping chamber 12 does not affect the conditions in the condensing chamber 32 or equalizing chamber 38 because the fluid in tube 36 serves to balance the pressures in the condensing chamber 32 and the equalizing chamber 38.

When the pumping bag 24 can expand no further, either due to material limitations or because it fills the pumping chamber 12, continued vaporization of the volatile fluid 26 serves to increase the internal pressure in the pumping bag 24 without causing a corresponding pressure increase in the tube 36. Further vaporization of the volatile fluid 26 causes the vapor within the pumping bag 24 to be forced downward past the low point of the U-shaped tube 28 and, thereafter, the vapor moves rapidly upward to the condensing bag 30, where it begins to condense. Any vapor that does not immediately condense expands the condenser bag 30. This displaces fluid from the condensing chamber 32 through tube 40 into the equalizing chamber 38 which, in turn, displaces fluid to be pumped 14 through tube 36 into the pumping chamber 24 which enables free flow from the pumping bag 24 into tube 28 and the condensing bag 30. As the volatile fluid 26 condenses within the condensing bag 30 and tube 28 the pressure within the pumping bag 24 decreases and the pumping bag 24 deflates. This creates a vacuum within the pumping chamber 12 which causes fluid to be pumped 14 to flow through the inlet check valve 20 and through the supply chamber 18 and conduit 16 to refill the pumping chamber 12. After the volatile fluid 26 condenses, it flows back down from the condensing bag 30, through the U-shaped tube 28 into the pumping bag 24, as in the initial condition described above, in readiness for the next "stroke" of the pump 10.

This form of the invention was constructed and operated by solar heat to verify the concept. Volatile fluid Freon R 113 which has a specific gravity of 1.5 was used to pump air.

Figure 2:
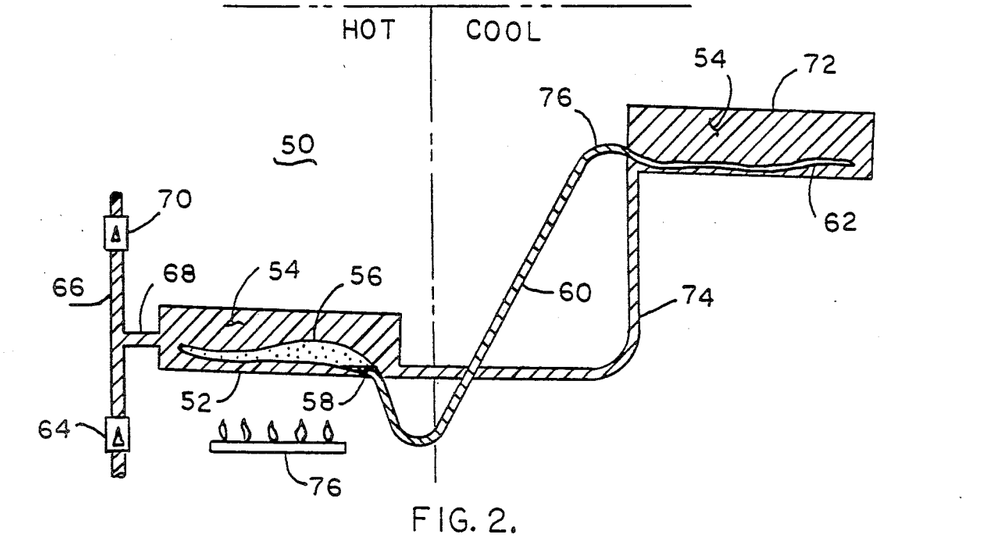
FIG. 2 is a diagrammatic representation of an alternative form of the fluid pump of the present invention which is preferred for pumping a liquid whose specific gravity is less than that of the volatile working fluid.

FIG. 2 shows an alternative form of the pump 10 which is applicable when the volatile liquid is of a greater specific gravity than the fluid to be pumped. In this form of the invention, the equalization chamber 38 of FIG. 1 has been omitted. This form of the present invention is shown generally at 50, having a rigid walled pumping chamber 52, a condensing chamber 72 which is located in a cooler environment and at an elevation higher than the pumping chamber 52, and a pipe 74 connecting the pumping chamber 52 with the condensing chamber 72. The fluid 54 to be pumped fills chambers 52 and 72 and the interconnecting pipe 74. A first variable volume chamber, in this embodiment a fluid-impermiable flexible bag called the pumping bag 56 is located within the pumping chamber 52 and contains a quantity of the volatile working fluid 58. A second similar variable volume chamber, in this embodiment a flexible bag called the condensing bag 62 is located within the condensing chamber 72. A pipe 60 interconnects the flexible bags 56 and 62 and is formed in a U-shape, extending downward from the lowest point of the first flexible bag 56 and, thence, upward to the second flexible bag 62. The fluid 54 to be pumped is supplied through input check valve 64, supply chamber 66 and conduit 68 to fill the pumping chamber 52. When the pumping bag 56 expands, it pushes the fluid 54 out through conduit 68 and through the fluid supply chamber 66 to exit through the output check valve 70. Finally, a heat source, such as flames 76, serves to heat the pumping bag 56.

In use, when the system is cold, as at first start up, all the volatile fluid 58 will be in its liquid state and will fill the pipe 60. Any excess will be present in the pumping bag 56. As heat is applied to the pumping bag 56, vapor forms which inflates the pumping bag 56 and forces the fluid 54 to be pumped out of the pumping chamber 52. The pressure developed to accomplish this flow is impressed equally in the pumping chamber 52, the condensing chamber 72 and in both flexible bags 56 and 62 by virtue of the pipes 60 and 74. Because this pressure is exerted equally on both of the flexible bags 56 and 62, it has no tendency to disturb the presence of the volatile fluid 58 in the pumping bag 56 during the entire vaporization or output half cycle. Expansion of the pumping bag 56 and resulting fluid flow occur when sufficient pressure is developed to overcome any back pressure present at the output check valve 70. When the pumping bag 56 cannot expand any further, either because it is completely filled or because it is restricted by the wall of the pumping chamber 52, further vaporization results in an increase of pressure within the pumping bag 56 which exceeds the pressure in the fluid 54 to be pumped and acts to force the remaining volatile fluid 58 as well as the trapped vapor from the pumping bag 56 down through pipe 60. Once the vapor passes the low point of the pipe 60, it rises rapidly through pipe 60 into the condensing bag 62, which is located within the condensing chamber 72. Condensation of the volatile fluid vapor 58 takes place at this time because the condensing chamber 72 is located in a cooler environment.

This transfer of the volatile fluid vapor 58 from the pumping bag 56 is aided by the siphon action induced by the weight of the liquid 54 to be pumped in the pipe 74, which is no longer outweighed by the volatile liquid 58 in pipe 60, and also by the vacuum formed in the condensing bag 62 by the lower vapor pressure compatible with its lower temperature. The flow of volatile fluid vapor 58 continues until the pumping bag 56 is completely empty and is accompanied by intake of liquid 54 to be pumped through intake check valve 64, supply chamber 66, and conduit 68. When all of the volatile fluid vapor is condensed, all of the volatile fluid 58 will reside, in liquid state, in the condensing bag 62 and in pipe 60. The weight of the liquid 58 in pipe 60 is then enough to overbalance the weight of the liquid 54 to be pumped residing in pipe 74 and a siphon action is initiated in which the volatile liquid 58 descends through pipe 60 and liquid 54 to be pumped flows up through pipe 74. This flow continues until the condensing bag 62 is completely empty, which reestablishes the conditions existing at the start of the cycle. The high point 76 of pipe 60 assures that condensation must be completed before pipe 60 can fill with liquid.

This form of the invention was constructed and operated to verify the concept. Solar heat was used to vaporize Freon R113 with a specific gravity of 1.5 to pump water.

Figure 3:
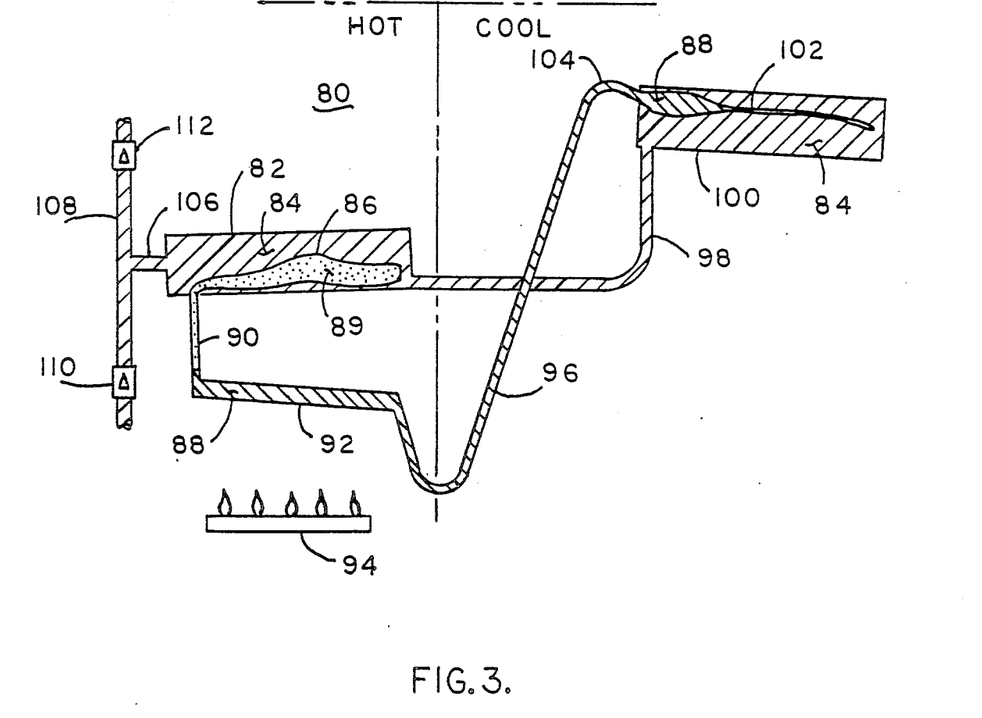
FIG. 3 is a diagrammatic representation of a further alternative form of the present invention which is preferred for pumping a liquid whose specific gravity is greater than that of the volatile working fluid.

FIG. 3 shows another alternative form of the pump 10 which is applicable when the volatile fluid is of lesser specific gravity than the fluid being pumped. In this form of the invention, the equalizing chamber 38 of FIG. 1 has been omitted. This form of the present invention shows a heat-activated pump, indicated generally at 80, having a rigid walled pumping chamber 82, a rigid walled condensing chamber 100 located in a cooler environment at an elevation higher than the pumping chamber 82 and a pipe 98 interconnecting the two chambers 82 and 100. The fluid 84 to be pumped fills chambers 82 and 100 and the interconnecting pipe 98. A first variable volume chamber, in this embodiment a fluid-impermiable flexible bag called the pumping bag 86 is located within the pumping chamber 82 with its lowest point connected through pipe 90 to the high point of a rigid boiler chamber 92. The low point of boiler 92 connects, through a U-shaped pipe 96, upward to a second variable volume chamber, in this embodiment a flexible bag called the condensing bag 102 located in the condensing chamber 100. A quantity of volatile working fluid 88, is located within the system formed by the two flexible bags 86 and 102, the boiler chamber 92 and the interconnecting pipes 90 and 96. The fluid 84 to be pumped is supplied through input check valve 110, supply chamber 108 and conduit 106 to fill the pumping chamber 82. When the pumping bag 86 expands, it pushes the fluid 84 to be pumped out through conduit 106 and through the suply chamber 108 to exit through the output check valve 112. Finally, a heat source, such as flames, 94 serves to heat boiler 92.

In use, when the system is cold, as at first start up, there is no volatile fluid vapor and the volatile fluid liquid 88 fills the boiler chamber 92 and its two associated pipes 90 and 96, with any excess liquid residing in the flexible bag 102 in the condensing chamber 100. The relative elevations of the three chambers 82, 92 and 100 are such that when pipe 96 and boiler chamber 92 are filled with volatile liquid 88, a siphon action is induced, the flow direction of which depends on whether the volatile fluid 88 which resides in pipe 90 is in the liquid or vapor state. When cold, at first start up, the fluid 88 in pipe 90 is in the liquid state and the total head of the volatile fluid 88 existing between chambers 100 and 82 is less than the opposing head of fluid to be pumped 84 in pipe 98. This condition establishes a siphon action tending to cause the fluid to be pumped 84 to flow downward in pipe 98 and to cause the volatile liquid 88 to flow upward in pipe 96. In the initial cold condition, no volatile fluid vapor exists and the above-described siphon action causes the pumping bag 86 to be fully deflated, with the rigid components 90, 92 and 96 being full of volatile liquid 88 and any excess being lifted into the condensing bag 102.

When heat 94 is applied to the boiler chamber 92, the volatile fluid 88 begins to boil and to generate vapor which replaces the liquid in pipe 90. When the pipe 90 is filled with the volatile fluid vapor 89 the total volatile liquid head, between chambers 100 and 82, is greater than the opposing head of liquid 84 to be pumped in pipe 98, thus establishing a siphon action tending to cause flow downward in pipe 96 and upward in pipe 98.

This pressure condition drives volatile fluid vapor 89 into the pumping bag 86, which forces the fluid 84 to be pumped to flow out of the pumping chamber 82. The pressure developed to accomplish this flow is impressed equally in the pumping chamber 82, the condensing chamber 100, the boiler chamber 92 and both flexible bags 86 and 102, by virtue of the interconnecting pipes 90, 96 and 98. Because this pressure is exerted equally on both of the flexible bags 86 and 102, it has no tendency to disturb the presence of volatile liquid 88 in the boiler chamber 92, which is continually replenished, as required, by flow downward through pipe 96. This situation remains in effect until such time as the pumping bag 86 reaches its limit of expansion. Further vaporization results in an unbalanced pressure which forces the volatile liquid and vapor 89 downward from the boiler 92 through pipe 96. When the volatile vapor 89 rounds the low point of the pipe 96, it rises rapidly to the condensing bag 102, located in the condensing chamber 100. Condensation of the volatile fluid vapor 89 takes place at this time because the condensing chamber 100 is located in a cooler environment. This transfer of volatile fluid vapor 89 from the pumping bag 86 is aided by the siphon action induced by the weight of the liquid 84 to be pumped residing in pipe 98, which is no longer outweighed by the volatile fluid liquid 88 in pipe 96, and also by the vacuum formed in the condensing bag 102 by lower vapor pressure compatible with the lower temperature. The flow of volatile fluid vapor 89 continues until the pumping bag 86 is completely empty.

Condensation, accompanied by intake of fluid 84 to be pumped through input check valve 110, takes place during this transfer, when all of the volatile fluid vapor 89 is condensed, all the volatile liquid 88 will reside in the condensing bag 102, pipe 96, boiler chamber 92 and pipe 90, thus, reestablishing the starting condition preparatory to another cycle. The high point 104 of pipe 96 assures that all the volatile fluid vapor 89 has been condensed before allowing the volatile liquid 88 to descend into pipe 96, boiler chamber 92 and pipe 90.

This form of the invention was constructed and operated extensively to verify the concept. A flat plate collector measuring two square feet was used to boil acetone which inflated a bag fabricated from an automobile inner tube to pump one gallon of water every three minutes against a five psi head. Acetone has a specific gravity of about 0.8 and boils at about 140 degrees F. at 15 psia.

Figure 4:
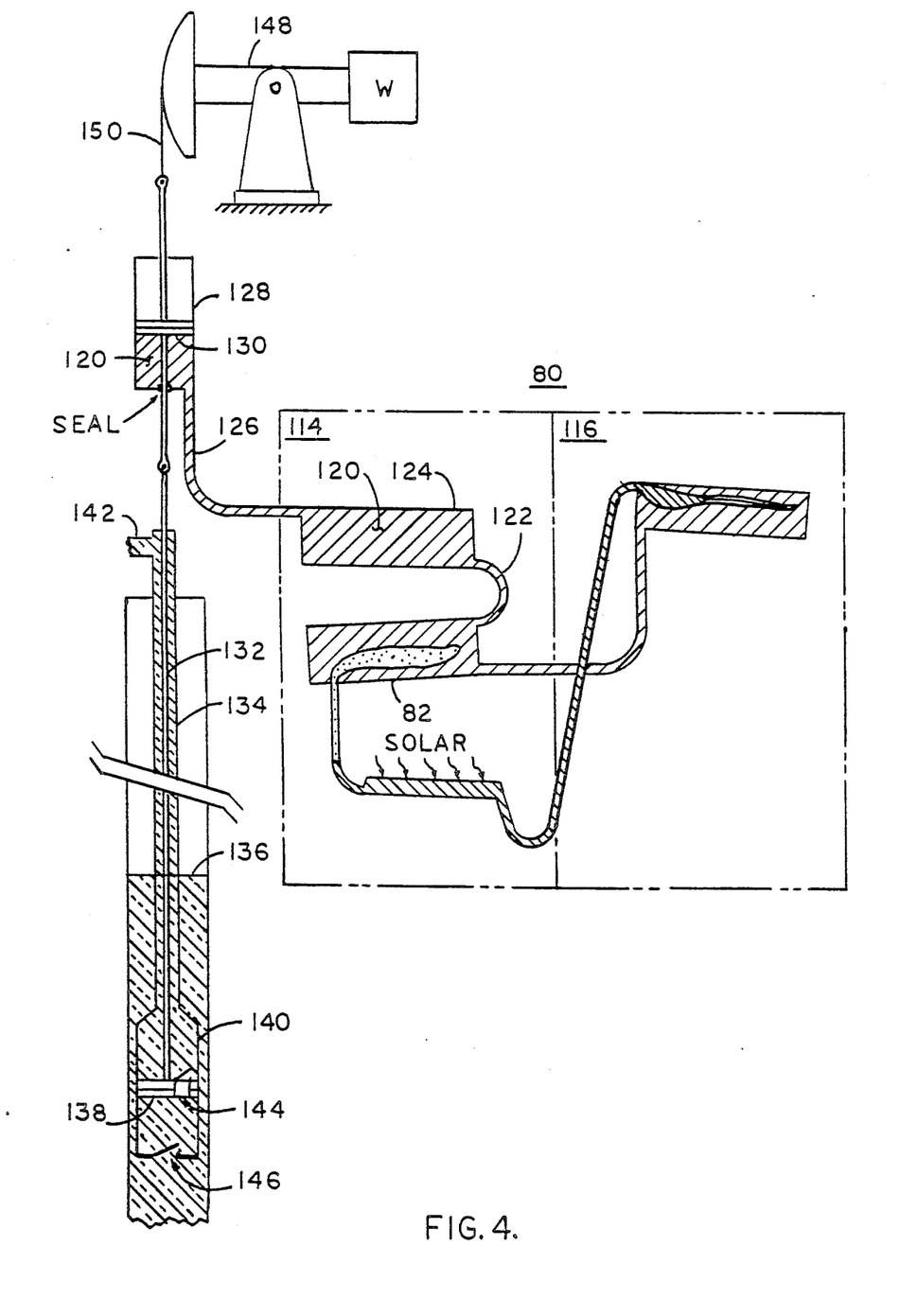
FIG. 4 is a diagremmatic representation showing the pump of FIG. 3 used to pump liquid from a deep well.

FIG. 4 shows an arrangement in which a fluid pump similar to that illustrated in FIG. 3, and indicated generally at 80, is employed as a cyclic mechanical power source. As shown the mechanical work accomplished is the pumping of a liquid, such as water or oil, from a deep well. For this purpose a pump 80 is shown contained within blocks 114 and 116. Block 114 contains those components of the pump 80 which receive heat, while block 116 contains those components which discharge heat. Consequently, block 114 may be considered hot, while block 116 is relatively cold. Substantially any desired means may be employed for supplying heat to block 114 and removing heat from block 116. As shown solar energy serves as a heat source. The output mchanism of FIG. 4 differs from that of FIG. 3 in that no check valves are used and the working fluid 120 passing from the pumping chamber 82 through output conduit 122 flows through a buffer tank 124 and conduit 126, both on entering and exiting the pump area of block 114. The purpose of the buffer tank 124 is to conserve heat. At the end of conduit 126, opposite from pump block 114, conduit 126 connects with working cylinder 128 at a point below the low point of piston 130. Thus, the alternate output and intake of the working fluid 120 through conduit 126, as driven by pump 80, causes the piston 130 to move up and down within cylinder 128 with a force which is the product of the pressure of the working fluid 120 times the area of the piston 130. Piston 130 is connected to a vertical connecting rod 132 which extends downward through the output conducting pipe 134 to a point beneath the passive liquid level of the fluid 136 to be pumped, where the connecting rod 132 connects to a second piston 138 slideably located within a second cylinder 140. The second cylinder 140 and second piston 138 are conventional and will be understood, by those skilled in the art, to lift liquid 136 to be pumped from its normal level within the well to a suitable output conduit 142 by virtue of the powerfully driven cyclic vertical motion of pistons 130 and 138 and by check valve 144, in the second piston 138 and check valve 146 in the bottom of the second cylinder 140. If desired, a counterbalancing rocker arm 148, which with a suitable weight W can be employed to provide a lifting force on cable 150 to cancel the weight of the moving mechanical parts.

Figure 5:
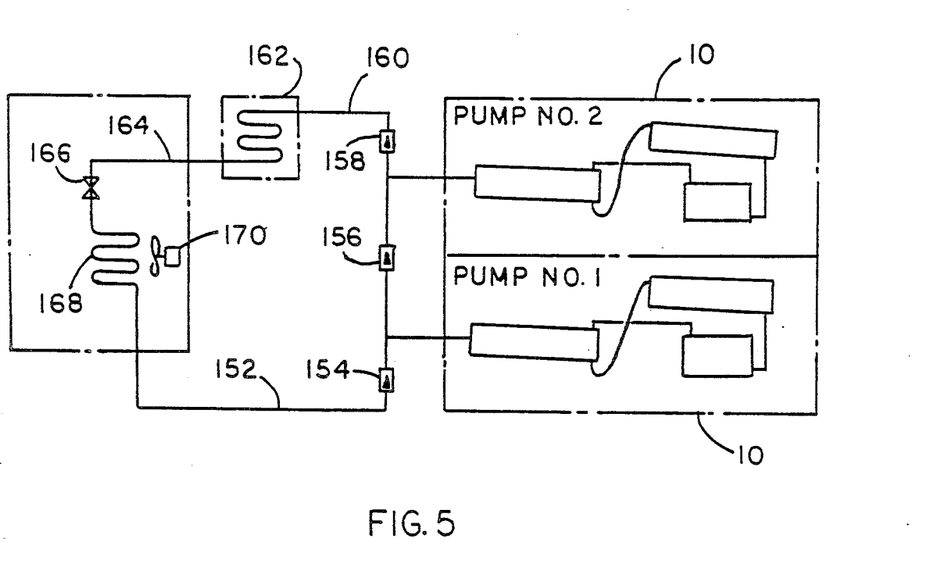
FIG. 5 is a diagrammatic representation showing cascaded stages of the fluid pump of the present invention in the form illustrated in FIG. 1 as they might be used to compress vapor for a conventional air conditioning or refrigeration system.

FIG. 5 shows an arrangement in which two of the present invention fluid pumping units such as 10 of FIG. 1 are connected in cascade to perform the compression function required in a conventional air conditioner which operates on freon R12. For purposes of illustration consider pump No. 1 charged with a quantity of commercially available Dupont HCFC141b as its volatile fluid. HCFC141b has a vapor pressure of 12 psia (pounds per square inch absolute) at 80 degrees F. and 65 psia at 180 degrees F. and is an environmentally safe alternative to Freon. As shown fluid line 152 conducts cooled R12 vapor in to pump No. 1 through check valve 154 at some low pressure down to 12 psia. Pump No. 1 then raises the R12 pressure to 65 psia. Consider pump No. 2 to be charged with a quantity of Dupont HCFC142b which has vapor pressures of 50 psia and 220 psia at 80 degrees and 180 degrees F. respectively.

In this manner R12 vapor is transferred from pump No. 1. to pump No. 2. through check valve 156 when pump No. 1. is in its pressure or output half cycle when its pressure can reach 65 psia and pump No. 2. is in its vacuum or intake half cycle when its pressure can be as low as 50 psia. If the input/output port of pump No. 2. is at a pressure over 65 psia pump No. 1. simply stalls and remains at its high pressure output condition, without flow, until such time that the intake port of pump No. 2. is at a low enough pressure to receive the output from pump No. 1. In this manner the two pump units are locked into a phase relationship wherein output time of pump No. 1. coincides with intake time of pump No. 2. and vice-versa. R12 vapor is then compressed from a low pressure as low as 50 psia to an output pressure up to 220 psia in pump No. 2. R12 vapor at 220 psia condenses at any temperature lower than 140 degrees F. This high pressure vapor then passes through check valve 158 and line 160 to a conventional cooling, condensing unit 162 the output of which is R12 liquid which passes through line 164 to an expansion valve 166 where the R12 liquid pressure is dropped to the intake pressure of pump No. 1. This reduction of pressure is accompanied by vaporization of the liquid R12 which results in the characteristic cooling of coil 168 and the air blown through this coil by means of fan 170. The amount of cooling is indicated by the −30 degrees F. characteristic of R12 vapor at 12 psia.

Figure 6:
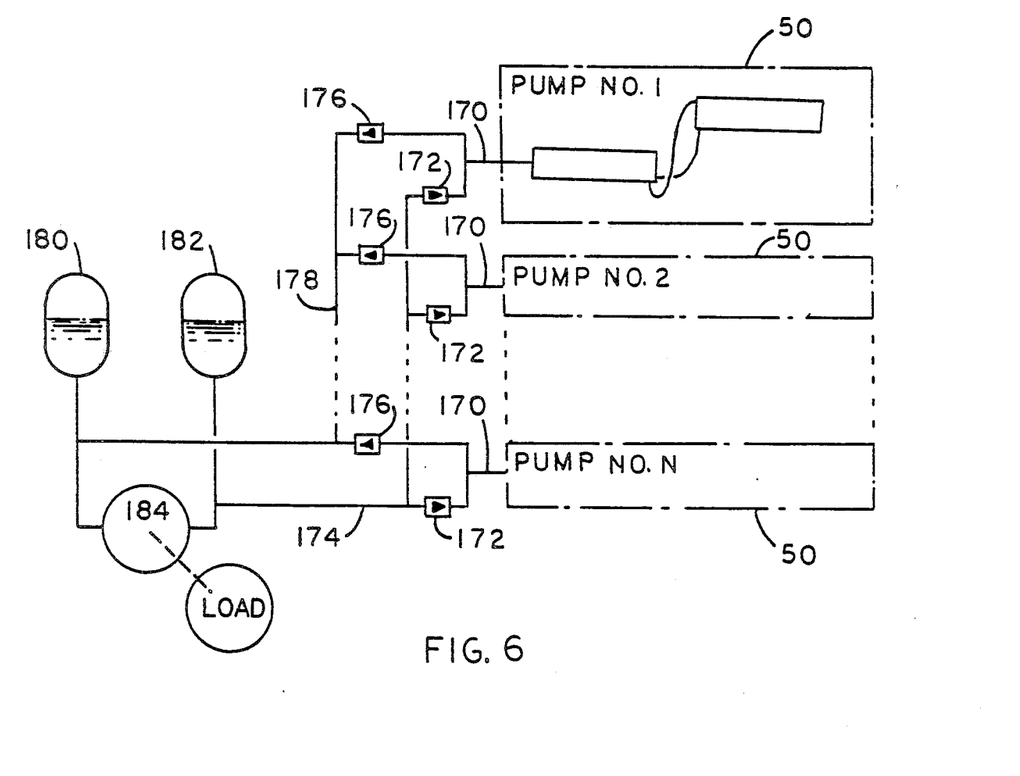
FIG. 6 is a diagrammatic representation showing paralleled stages of the fluid pump of the present invention in the form illustrated in FIG. 2 as they might be connected to generate significant amounts of power for driving an hydraulic motor load.

FIG. 6 shows a configuration in which a plurality of fluid pumping units such as pump 50 of FIG. 2. are connected in parallel to produce significant mechanical power from heat through the use of hydraulic means. A plurality of pumping units, pump No. 1. through pump No. N. are shown at the right of FIG. 6 each with an input/output conduit 170 which each receive intake liquid through a respective one of the check valves 172 from a low pressure manifold line 174 and which each force the same fluid out through a respective one of the output check valves 176 to a common high pressure manifold line 178. Minor pressure variations in each manifold line are dampened out by the use of conventional hydraulic accumulators 180 in the high pressure manifold 178, and 182 in the low pressure manifold. Mechanical rotary power is obtained from an hydraulic motor 184 which is connected between the two accumulators 180 and 182. It is in this configuration that the pressure insensitive nature of the pumping mechanisms 50 of the present invention is exceptionally advantageous. Since the entire hydraulic system comprising the plurality of pumping units, pump No. 1.—pump No. N., the accumulators 180 and 182, the motor 184 and all interconnecting lines make up a closed system, the passive pressure of that system can be adjusted by pressurizing the accumulators 180 and 182 to substantially any desired pressure compatible with the volatile liquid being used, the temperatures expected and the pressure differential desired across the motor 184.

In all of the drawings of the above figures flexible bags have been illustrated to represent variable volume chambers. It should be noted that other moveable impermiable means such as membranes, pistons or bellows would be equally effective for separating the rigid walled chambers into two complementary, variable volume chambers.

Obviously, numerous other variations and modifications can be made without departing from the spirit of the present invention, therefore, it should be clearly understood that the forms of the present invention described above and shown in the figures of the accompanying drawings are illustrative and are not intended to limit the scope of the present invention.

What is claimed is:

1. An automatic cycling, heat powered, fluid pump actuated by the vaporization and condensation of a volatile working fluid wherein the cyclic action of the pump is accomplished without the use of control valves or other external influence but only by the force of gravity and the pressure difference characteristic of the working fluid vapor pressures at two different temperatures, said two temperatures resulting from the continuous application of heat at one place and the continuous extraction of heat from another place, said fluid pump comprising:

a rigid walled pumping chamber;

rigid walled condensing chamber located in a cooler environment and at a higher elevation than the pumping chamber;

fluid conduit means interconnecting the two rigid walled chambers;

a first variable volume chamber located within the pumping chamber;

a second variable volume chamber located within the condensing chamber;

fluid conductor means interconnecting the two variable volume chambers;

a quantity of a working fluid located within the variable volume system composed of said first and second volume chambers and their interconnecting fluid conductor means;

a fluid to be pumped, gasseous or liquid, located within the rigid walled chambers and their interconnecting conduit means but outside said variable volume system;

an intake/output port permitting flow of fluid to be pumped into and out of the pump;

heating means supplying heat to vaporize said working fluid, the vapor of which collects in said first variable volume chamber within the pumping chamber and, cooling means removing heat to cause condensation of working fluid vapor in said second variable volume chamber within the condensing chamber;

whereby vaporization of the working fluid forces an accumulation of vapor within the first variable volume chamber thus expanding this chamber and raising the pressure within the fluid to be pumped to a level sufficient to cause it to flow out of the pump, said expansion and flow continuing until said first variable volume chamber reaches the limits of its expansion after which further vaporization forces the remaining working fluid and vapor out of said first variable volume chamber thence upward through said fluid conductor means and into said second variable volume chamber where heat is extracted thus condensing the working fluid vapor and causing a contraction of the volume of the working fluid system with an attendant reduction of pressure to a level at which an intake flow of fluid to be pumped occurs said contraction and intake flow continuing until condensation is complete at which time the condensed working fluid liquid fills the fluid conductor means thus satisfying the conditions necessary to establish a gravity induced siphon by which the condensed liquid returns through the fluid conductor means to the place of vaporization and initiates another cycle.

2. The fluid pump of claim 1 wherein:

said fluid conduit means is configured to form an equalization chamber which alters the pressure head between said rigid walled pumping chamber and said walled condensing chamber from that which would exist if said fluid conduit means were a simple conductor filled with fluid to be pumped.

3. The fluid pump of claim 1 wherein said fluid conductor means interconnecting said first and second variable volume chambers is in the form of a generally U-shaped tube.

4. The fluid pump of claim 1 wherein:

said fluid conductor means interconnecting the said first and second variable volume chamber is configured to include boiler means for vaporizing the working fluid at a location below said pumping chamber; said boiler means serving the dual function of enhancing vaporization and, by its location, altering the pressure head between said first and second variable volume chambers from what it would be if said fluid conductor means were a simple conductor filled with the working fluid.

5. The fluid pump of claim 1 further comprising:

first and second one way fluid flow valves associated with said intake/output port of said fluid pump arranged so as to provide unidirectional flow of the fluid being pumped.

6. The fluid pump of claim 1 further comprising:

a buffer chamber communicating with said intake/output port of said pump the purpose of which is to conserve heat by recycling the same fluid to be pumped in and out of the pump while the fluid performing useful work never enters the heated area of the pump but only said buffer chamber.

7. A fluid pumping system comprising:

a plurality of fluid pumps of claim 1 connected in series with each succeeding pump charged with a more volatile working fluid than the previous one;

a device utilizing fluid circulated by said fluid pumping system; and a circulation system connected to carry fluid between said fluid pumping system and said device including a first check valve directing system fluid flow from said circulation system into first one of said fluid pumps, a check valve between each two successive fluid pumps directing fluid flow from the lower pressure pump to the next higher pressure pump, and a last check valve directing fluid flow from the last, highest pressure, fluid pump into said circulation system.

8. The pumping system of claim 7 wherein:

said device is a refrigeration system.

9. The pumping system of claim 7 wherein:

said device is an air conditioning sytstem.

10. A fluid pumping system comprising:

a plurality of pumps of claim 1 connected in parallel;

a device utilizing fluid driven by said plurality of fluid pumps; and a circulation system connected to carry fluid between said device and said plurality of fluid pumps and including an input manifold carrying fluid from said device and having a plurality of input check valves, each directing flow from said input manifold to a respective one of said fluid pumps; and an output manifold serving to carry fluid from said fluid pumps to said device and having a plurality of output check valves, each of said output check valves directing flow from a respective one of said fluid pumps to said output manifold.

11. The pumping system of claim 10 wherein:

said device is an hydraulic motor.

12. The pumping system of claim 10 wherein:

said system is pressurized or evacuated to some predetermined pressure which is conveniently compatible with the volatile working liquid being used and the temperature at which the system is intended to operate.

* * * * *